S. BZSAN.
TIE ROD FOR THE RAILS OF A TRACK.
APPLICATION FILED JUNE 30, 1911.
1,003,330.
Patented Sept. 12, 1911.
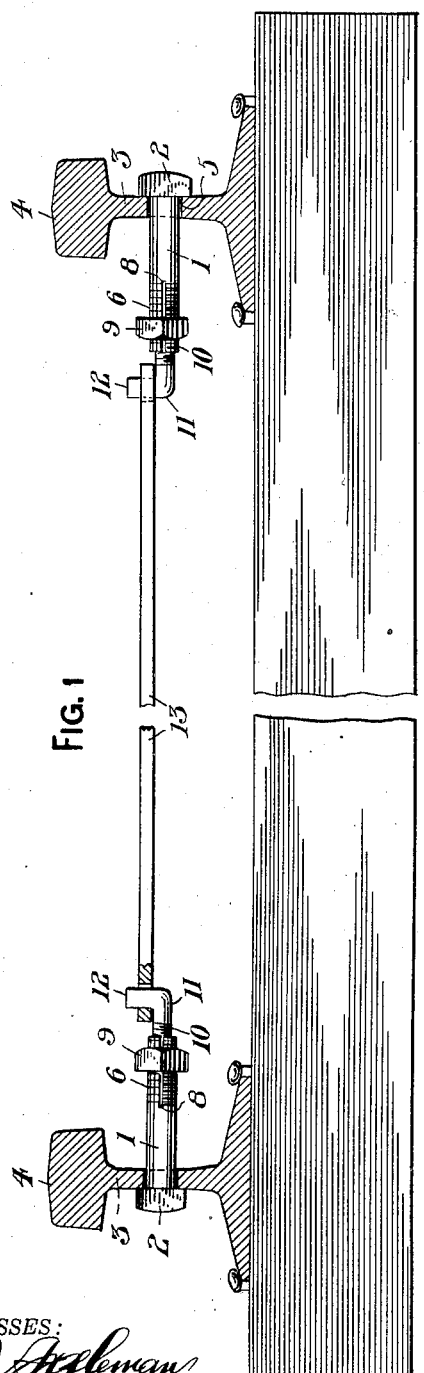
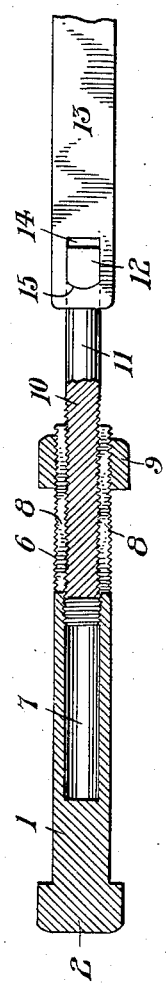
WITNESSES:
INVENTOR.
S. Bzsan
BY
ATTORNEYS

UNITED STATES PATENT OFFICE.

STEPHEN BZSAN, OF STRAWN, TEXAS.

TIE-ROD FOR THE RAILS OF A TRACK.

1,003,330. Specification of Letters Patent. Patented Sept. 12, 1911.

Application filed June 30, 1911. Serial No. 636,160.

*To all whom it may concern:*

Be it known that I, STEPHEN BZSAN, a subject of the King of Hungary, residing at Strawn, in the county of Palo Pinto and State of Texas, have invented certain new and useful Improvements in Tie-Rods for the Rails of a Track, of which the following is a specification, reference being had therein to the accompanying drawing.

This invention relates to tie rods for the rails of a track, and the primary object of my invention is to provide an adjustable connecting rod that can be adjusted from time to time to assist in maintaining the proper gage of the track.

A further object of this invention is to provide a tie rod that is simple in construction, durable, easy to install and highly efficient for the purposes for which it is intended.

I attain the above objects by a mechanical construction that will be hereinafter specifically described and then claimed.

Reference will now be had to the drawing, wherein:—

Figure 1 is a side elevation of a tie rod in accordance with this invention, and Fig. 2 is an enlarged plan of a portion of the tie rod partly broken away and partly in section.

A tie rod in accordance with this invention comprises bolts 1 having heads 2 adapted to engage the outer sides of the webs 3 of rails 4, said webs having openings 5 providing clearance for the blots 1. The threaded ends 6 of the bolts are slightly tapered, the taper being hardly perceptible to the eye, and these threaded ends are provided with longtudinal bores 7 and with longitudinal oppositely disposed slits or slots 8, whereby the tapering end of each bolt can be contracted by screwing thereon a nut 9.

The walls of the bores 7 are screw threaded and adjustably mounted in said bores are the threaded shanks 10 of hooks 11. Fitting over the bills 12 of the hooks are the ends of a connecting bar 13, said bar having the ends thereof provided with openings 14 and the outer walls of the opening are concave to conform to the side wall of the bill 12 of each hook. The advantage of this construction is that the hooks obtain a firm purchase upon the ends of the connecting bar 13, particularly when the hooks are adjusted. When the nuts 9 are loose upon the bolts 1, the hooks 11 can be adjusted within the bore 7 and then by tightening the nuts 9, the hooks 11 can be locked in their adjusted position relatively to said bolts. Should the connecting bar 13 be mounted upon the ends of the hooks, the nuts 9 can be loosened and the bolts 1 rotated to draw the hooks toward the rails and after the bar has been made taut, the nuts 9 can be tightened whereby the threaded ends of the bolts will grip the threaded ends of the hooks.

What I claim is:—

1. A tie for the rails of a track, comprising bolts having the headed ends thereof held by rails and the screw threaded ends thereof provided with longitudinal interiorly screw threaded bores with the walls of said bores longitudinally slitted or slotted, hooks having threaded ends screwed in the bores of said bolts, nuts screwed upon said bolts and adapted to clamp the ends of said bolts upon the threaded ends of said hooks, and a connecting bar having the ends thereof apertured and adapted to receive said hooks.

2. A tie rod for the rails of a track, comprising bolts having the headed ends thereof detachably held by the rails and the threaded ends thereof provided with longitudinal interiorly screw threaded bores, hooks having threaded ends screwed into the bores of said bolts, a connecting rod having the ends thereof provided with openings to receive said hooks, and means including nuts adapted to lock said hooks in engagement with said bolts.

In testimony whereof I affix my signature in the presence of two witnesses.

STEPHEN BZSAN.

Witnesses:
M. G. VERNON,
H. M. STEVENSON.

Copies of this patent may be obtained for five cents each, by addressing the "Commissioner of Patents, Washington, D. C."